United States Patent
Paskalev et al.

(10) Patent No.: US 9,252,892 B2
(45) Date of Patent: Feb. 2, 2016

(54) DEVICE AND METHOD FOR ACTIVE REDUCTION OF RADIO FREQUENCY NOISE

(71) Applicants: Bisser Georgiev Paskalev, Alpharetta, GA (US); Douglas Hoyt Bennett, Marietta, GA (US); Latchezar Georgiev Paskalev, Alpharetta, GA (US)

(72) Inventors: Bisser Georgiev Paskalev, Alpharetta, GA (US); Douglas Hoyt Bennett, Marietta, GA (US); Latchezar Georgiev Paskalev, Alpharetta, GA (US)

(73) Assignee: NCR Corporation, Duluth, GA (US)

( * ) Notice: Subject to any disclaimer, the term of this patent is extended or adjusted under 35 U.S.C. 154(b) by 253 days.

(21) Appl. No.: 13/905,299

(22) Filed: May 30, 2013

(65) Prior Publication Data

US 2014/0354579 A1    Dec. 4, 2014

(51) Int. Cl.
*G06F 3/041* (2006.01)
*H04B 15/02* (2006.01)
*G06F 3/044* (2006.01)

(52) U.S. Cl.
CPC ............... *H04B 15/02* (2013.01); *G06F 3/044* (2013.01); *G06F 3/0418* (2013.01); *G06F 2203/04107* (2013.01)

(58) Field of Classification Search
CPC combination set(s) only.
See application file for complete search history.

(56) References Cited

U.S. PATENT DOCUMENTS

| | | | | |
|---|---|---|---|---|
| 3,983,422 | A * | 9/1976 | Nicolson et al. | 327/195 |
| 5,625,327 | A * | 4/1997 | Carroll et al. | 331/74 |
| 2007/0210862 | A1* | 9/2007 | Denker et al. | 330/10 |
| 2007/0268857 | A1* | 11/2007 | So et al. | 370/328 |
| 2011/0299575 | A1* | 12/2011 | Aoulad Ali et al. | 375/219 |

* cited by examiner

*Primary Examiner* — Junpeng Chen
(74) *Attorney, Agent, or Firm* — Schwegman, Lundberg, Woessner

(57) ABSTRACT

A radio frequency noise reduction device and methods of operation are presented. The radio frequency noise reduction device identifies radio frequency noise on an isolated power plane of an electronic apparatus and generates an electrical signal that is injected into the isolated power plane and cancels the identified radio frequency noise. The generated electrical signal matches the frequency spectrum and amplitude of the identified radio frequency noise but the phase of the generated electrical signal is shifted by 180 degrees from the identified radio frequency noise.

20 Claims, 4 Drawing Sheets

DEVICE AND METHOD FOR ACTIVE REDUCTION OF RADIO FREQUENCY NOISE

FIELD OF THE INVENTION

The present invention relates to reducing radio frequency noise in an electronic apparatus and more specifically to identifying and actively canceling radio frequency noise in an electronic apparatus.

BACKGROUND

Touch screen displays are widely used in many different types of products. A few examples of electronic products that use touch screen displays are tablet computers, smart phones, laptop computers, automatic teller machines (ATM) and point of sale (POS) terminals. There are multiple technologies that can be used to implement the touch screen component of a touch screen display. Each of the technologies has advantages and disadvantages. Some of the technologies reduce the amount of light transmitted by the display while other methods have good light transmission characteristics, but are susceptible to radio frequency noise which causes identification of a touch when no actual touch occurred.

Most countries require that electronic products sold in their country meet certain minimum safety and security requirements. The requirements are typically codified in statutes, regulations, standards or documents that specify the tests and measurements that electronic products must comply with for a given country. Products that fail to meet the requirements for a country cannot be sold in that country. The requirements are typically maintained by a government agency, an organization or a company. Some examples of entities that maintain requirements are Underwriters Laboratories (UL), the Federal Communications Commission (FCC) and the International Electrotechnical Commission (IEC).

Some product requirements, such as the electromagnetic compatibility (EMC) requirements from the IEC, specify different levels of compliance for the same apparatus based on how the apparatus is used or the function performed by the system that uses the apparatus. For example, a touch screen display used on a tablet computer is generally held to a lower standard of EMC compliance than the same touch screen display used on a point of sale terminal or an automatic teller machine (ATM). Touch screen displays used on a point of sale terminal or an ATM are held to a higher level of EMC compliance because these systems perform financial transactions and any failure is considered to be critical. If these products are to meet the higher EMC standard, certain technologies cannot be used. For example, certain touch technologies experience failures in the presence of radio frequency noise which cause the apparatus to fail the higher EMC standard.

SUMMARY

Among its several aspects, the present invention seeks to overcome or ameliorate at least one of the disadvantages of the prior art, or to provide a useful alternative.

In accordance with the teachings of the present invention, a radio frequency noise reduction device and methods of operation are provided for identifying radio frequency noise in an electronic apparatus and for generating a signal that cancels all or a substantial portion of the identified radio frequency noise.

Among its several aspects, the present invention recognizes there is an advantage to being able to identify radio frequency noise within an electronic apparatus and to generate a signal that cancels or greatly reduces the radio frequency noise. The advantage includes removing radio frequency noise that interferes with the normal operation of the electronic components of the apparatus. The radio frequency noise causes certain components of the electronic apparatus to malfunction which either reduces the functionally of the electronic apparatus or renders it inoperative.

Among its several aspects, the present invention recognizes that certain electronic components, such as electronic analog devices, are sensitive to radio frequency noise present on power planes that supply power or grounding to the components. The radio frequency noise causes the sensitive components to generate false signals that cause failures in the apparatus using the components. The failures can be random or continuous when the radio frequency noise is present. The radio frequency noise can be generated by other components in the apparatus or injected into the apparatus to perform a test such as an electromagnetic compatibility test.

Among its several aspects, the present invention recognizes there is an advantage to being able to dynamically identify and generate a signal that cancels or greatly reduces radio frequency noise within an electronic apparatus. The dynamic nature of the present invention allows the generated signal to change in real-time to match the current frequency spectrum and amplitude of the radio frequency noise. In the absence of any identifiable radio frequency noise, the generated signal turns off.

In accordance with an embodiment of the present invention, there is provided a radio frequency noise reduction device used in an electronic apparatus. The device comprises: a first bandpass filter adapted to receive a first signal from a first power plane where the first signal includes radio frequency noise, and is referenced to chassis ground, and where the first bandpass filter is further adapted to output only a first predetermined band of radio frequencies; a second bandpass filter adapted to receive a second signal from a second power plane physically isolated from the first power plane, but electrically coupled to the first power plane, and where the second signal is referenced to chassis ground and includes radio frequency noise, and where the second bandpass filter is further adapted to output only the first predetermined band of radio frequencies; and, a variable gain amplifier adapted to receive and amplify the output of the first bandpass filter, and adapted to use the output of the second bandpass filter to control the gain of the variable gain amplifier wherein the output of the variable gain amplifier is connected to the second power plane, and wherein the variable gain amplifier is further adapted to produce an output signal that cancels radio frequency noise on the second power plane.

In accordance with another embodiment of the present invention, there is provided a method of reducing radio frequency noise in an electronic apparatus including a first power plane and a second power plane that is physically isolated from the first power plane, the method comprising: continuously receiving a first signal from the first power plane where the voltage of the signal is measured with respect to chassis ground; generating a first modified signal by passing the received first signal through a bandpass filter set to limit the frequencies that comprise the first modified signal to a first predefined frequency band; continuously receiving a second signal from the second power plane where the voltage of the signal is measured with respect to chassis ground; generating a second modified signal by passing the received second signal through a bandpass filter set to limit the frequencies that comprise the second modified signal to the first predefined frequency band; generating a third modified signal by passing the first modified signal through a variable gain amplifier where the second modified signal controls the gain of the variable gain amplifier and where the output of the variable gain amplifier is the first signal filtered and phase shifted by 180 degrees; and injecting the third modified signal into the second power plane where the third modified signal cancels the radio frequency noise on the second power plane.

A more complete understanding of the present invention, as well as further features and advantages of the invention, will be apparent from the following Detailed Description and the accompanying Drawings.

BRIEF DESCRIPTION OF THE DRAWINGS

The present invention may take form in various components and arrangement of components and in various methods. The drawings are only for purposes of illustrating example embodiments and alternatives and are not to be construed as limiting the invention. The drawings are not necessarily drawn to scale. Throughout the drawings, like element numbers are used to describe the same parts throughout the various drawings, figures and charts.

DETAILED DESCRIPTION

In the following description, numerous details are set forth to provide an understanding of the claimed invention. However, it will be understood by those skilled in the art that aspects of the claimed invention may be practiced without utilizing all of these details and that numerous variations or modifications from the described embodiments are possible and envisioned.

Figure 1:
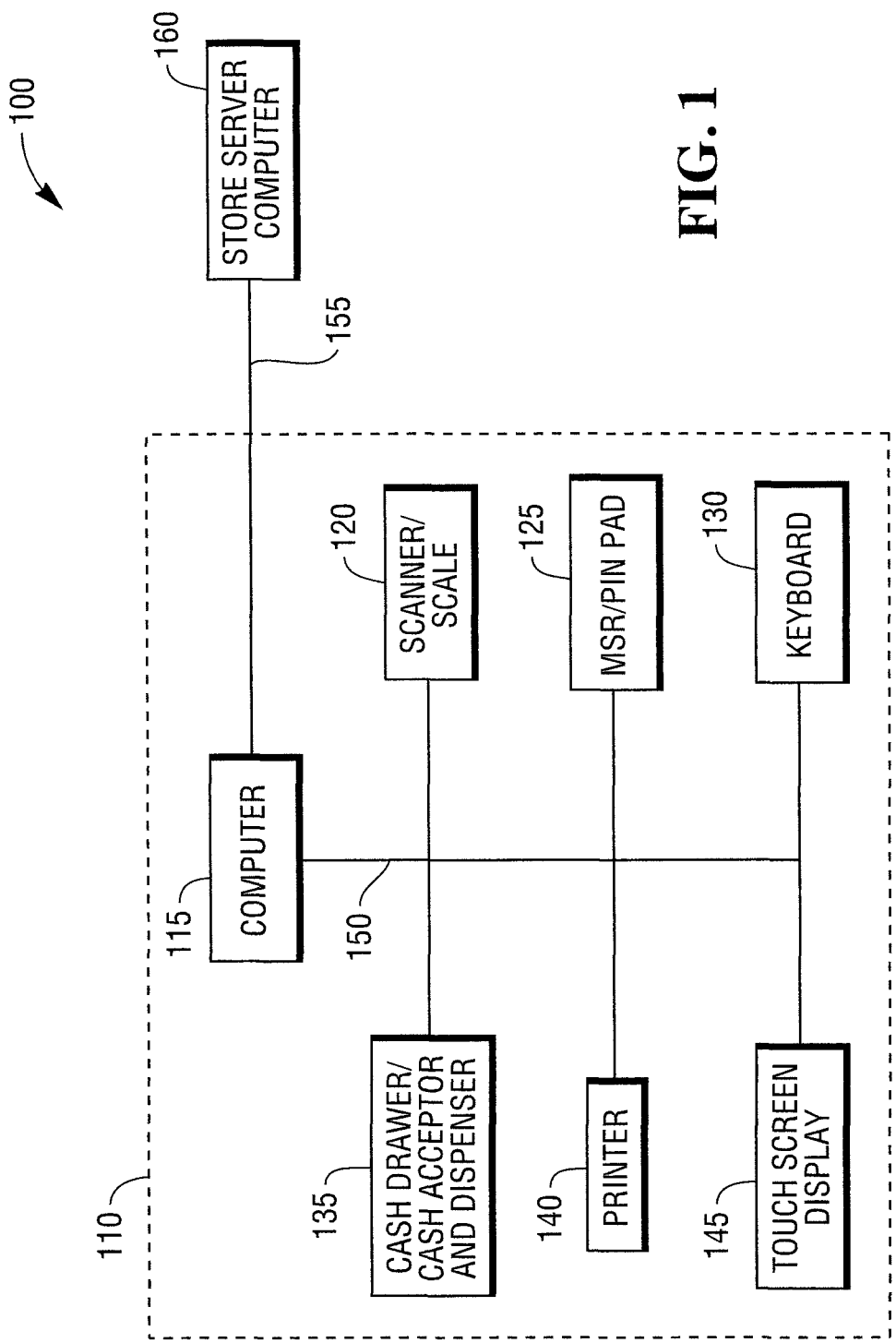
FIG. 1 is a high-level block diagram illustrating a point of sale system of the present invention.

With reference to FIG. 1, there is provided a high-level block diagram illustrating a point of sale system 100. The point of sale system 100 of the present embodiment includes a point of sale terminal 110 in communication with a store server computer 160 using a network 155. The point of sale terminal 110 performs purchase transactions by identifying one or more items presented for purchase by a customer and accepting payment for the items purchased. During the purchase transactions, the point of sale terminal 110 communicates with the store server computer 160 to send and receive data related to the purchase transactions.

Although only one point of sale terminal 110 is depicted, it should be appreciated that the point of sale system 100 supports multiple point of sale terminals 110 that use the network 155 to communicate with the store server computer 160. Additionally, it should be appreciated that the point of sale terminal 110 may suitably be embodied as an assisted point of sale terminal or a customer operated point of sale terminal. In some embodiments, the point of sale system 100 includes both assisted point of sale terminals and customer operated point of sale terminals.

The network 155 may suitably include a network which uses a communications protocol based on transmission control protocol/internet protocol (TCP/IP). The network 155 may suitably include a combination of local area and wide area networks. The network 155 may further suitably include any combination of wireless and wired networks. The wireless networks include local area wireless computer networks and cellular based data networks.

The store server computer 160 includes a processor and memory where the memory includes application software. The processor of the store server computer 160 executes the application software which causes the processor to perform features and functions that support the operations of the store. The application software provides features and functions that may suitably include support for point of sale operations, an item lookup database, sales and inventory management, personnel management and customer assistance services.

The point of sale terminal 110 suitably includes a computer 115, a scanner/scale device 120, a magnetic stripe reader/personal identification number (MSR/PIN) PAD device 125, a keyboard device 130, a cash drawer/cash acceptor and dispenser 135, a printer device 140, a touch screen display 145 and a computer network 150. The computer network 150 may include more than one type of network, where each network is used to communicate with different devices attached to the computer 115. The computer 115 communicates with the devices over the computer network 150 which may suitably include an implementation of the industry standard Universal Serial Bus (USB). The computer network 150 may additionally include a second network designed to communicate with a display device such as the touch screen display 145.

The computer 115 may suitably include a personal computer designed for use within another apparatus such as the point of sale terminal 110. In some embodiments, the computer 115 is a single board computer. The computer 115 includes a processor, memory, a network controller for controlling the external network 155 and a computer network controller for controlling the computer network 150. The memory of the computer 115 includes computer instructions that are executed by the processor of the computer 115 and which cause the processor to control the components and devices of the point of sale terminal 110 and provide the high level functions of the point of sale terminal 110.

The MSR/PIN PAD device 125 is a magnetic stripe reader with a personal identification number (PIN) pad device. It reads information from the magnetic stripe on a card that is moved through the device 125. For example, the device 125 reads the magnetic stripes found on the back of credit, debit and loyalty cards plus magnetic stripes found on the back of some driver licenses. The PIN PAD allows a customer or operator to enter a personal identification number that may be associated with the card. This information is then securely transmitted to the computer 115 over the computer network 150.

The cash drawer/cash acceptor and dispenser device 135 may suitably include just a cash drawer device or just a cash acceptor and dispenser device or both. Operator assisted embodiments of the point of sale terminal 110 may suitably include just the cash drawer device because an employee will handle the currency. Customer operated embodiments of the point of sale terminal 110 may suitably include just the cash acceptor and dispenser device which secure the currency but allow a customer to give and receive currency. In yet other embodiments, both the cash drawer device and cash acceptor and dispenser device are present. The cash drawer/cash acceptor and dispenser devices 135 communicate with and are controlled by the computer 115 using the computer network 150.

The touch screen display 145 includes an electronic display device that displays information received from the computer 115 over the computer network 150 to a customer or operator. The touch screen display 145 further includes a touch screen controller 222 (FIG. 2) that detects when and where the surface of the touch screen display 145 is touched and sends information about the touch to the computer 115 over the computer network 150. Some embodiments have more than one touch screen display 145 where one touch screen display 145 is used by an employee operating the point of sale terminal 110 and a second touch screen display 145 is used by a customer that is making a purchase.

Figure 2:
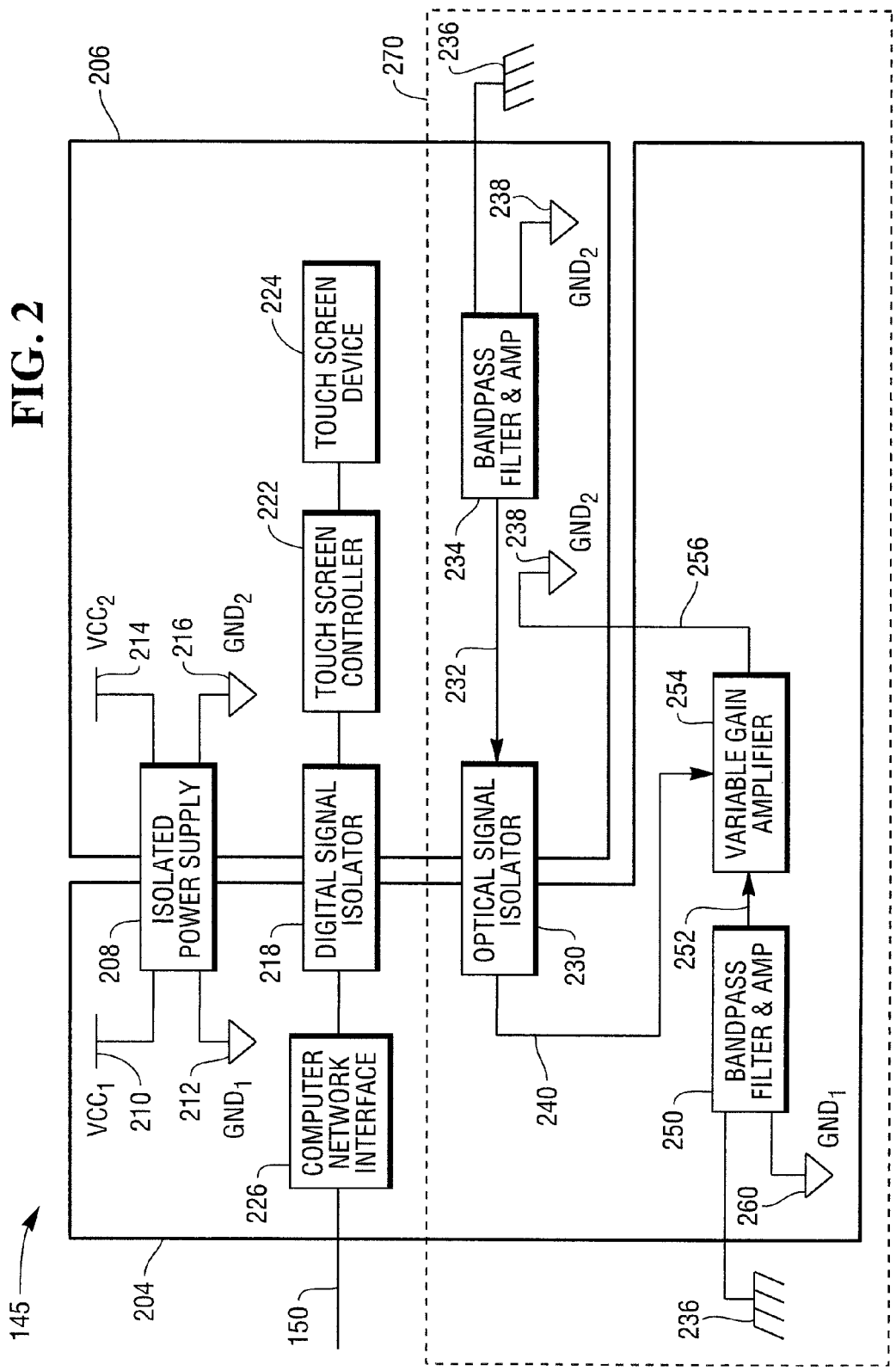
FIG. 2 is a high-level block diagram illustrating selected electronic and electrical components of a touch screen display used by a point of sale terminal.

Turning now to FIG. 2, there is provided a high-level block diagram illustrating selected electronic and electrical components of the touch screen display 145. The illustrated components are specific to the touch screen functions of the touch screen display 145. FIG. 2 depicts a first power plane 204 and a second power plane 206. In this embodiment, both power planes 204, 206 are ground planes and the depicted components are attached to whichever one of the power planes 204, 206 is local to the component. In some cases, a component may be attached to both power planes 204, 206 to isolate and allow signals to pass across the barrier between the two power planes 204, 206. In other embodiments, the two power planes 204, 206 are power distribution planes that have same voltage potential.

The second power plane 206 is physically isolated from the first power plane 204. However, the second power plane 206 is electrically coupled to the first power plane 204 in a number of different ways including through an isolated power supply 208. The electrical coupling allows radio frequency noise on the first power plane 204 to be transmitted to the second power plane 206. Other modes of electrical coupling between the two power planes 204, 206 also allow radio frequency noise to be transmitted from the first power plane 204 to the second power plane 206. These other modes of electrical coupling include capacitive and inductive coupling between the two power planes 204, 206 based on their physical proximity to each other and coupling through devices 218, 230 used to isolate and transmit signals between the two power planes 204, 206.

The isolated power supply 208 in this embodiment is a DC to DC converter. The isolated power supply 208 has a primary side and a secondary side. Electrical power is received on the primary side, converted and output on the secondary side. The primary side includes a connection to a voltage supply depicted as VCC1 210 and a connection to ground depicted as GND1 212. GND1 is a connection to the first power plane 204. The secondary side includes a connection to a local voltage supply depicted as VCC2 214 and a connection to local ground depicted as GND2 216 which is connected to the second power plane 206. The isolated power supply 208 provides the power to the local voltage supply VCC2 214 which can be used by components that are grounded to the second power plane 206.

Also depicted in FIG. 2 is a touch screen controller 222 that controls a touch screen device 224. The touch screen device 224 is part of the display surface of the touch screen display 145. The touch screen device 224 detects and identifies the location of a touch to the display surface of the touch screen display 145. In this embodiment, the touch screen device 224 uses projected capacitance touch technology to detect and identify the location of a touch to the display surface. Other embodiments may use different technologies to detect and identify touch locations. Projected capacitance touch technology has a number of positive qualities such as a high level of optical transparency which allows the majority of the light generated by the display 145 to pass through. However, the technology is sensitive to radio frequency noise which causes false touch indications. This sensitivity to radio frequency noise will cause an apparatus based on projected capacitance touch technology to fail the higher level EMC testing required for a financial apparatus if steps to reduce the radio frequency noise are not taken.

The touch screen controller 222 and the touch screen device 224 are connected to the second power plane 206 and are subject to any electrical noise such as radio frequency noise that may be present on the second power plane 206. The touch screen controller 222 communicates with the computer 115 over the computer network 150. A computer network interface device 226 provides the functions required for the touch screen controller 222 to send and receive data over the computer network 150. The computer network interface device 226 is grounded to the first power plane 204. A digital signal isolator 218 is used to electrically isolate signals between the touch screen controller 222 and the computer network interface device 226.

Common mode noise in an electronic apparatus includes radio frequency electrical signals that can interfere with the normal operation of electronic components in the electronic apparatus. Common mode noise is present on both the electrical ground and power distribution of the electrical system of the electronic apparatus. Power distribution and grounding in an electrical system can be physically partitioned to electrically isolate sections of the electrical system that have components that are more sensitive to electrical noise. Some sensitive components can suffer damage if not protected while other sensitive components will fail to operate properly in the presence of certain types of electrical noise such as radio frequency noise. Even though the ground and power distribution for a section of the electronic system is physically isolated from the system's main ground and power, electrical noise from the main ground and power will still couple onto the isolated ground and power planes and can cause problems for electronic components connected to the isolated planes.

In FIG. 2, radio frequency noise on the first power plane 204 couples to the second power plane 206. The amplitude of the radio frequency noise will differ between the two power planes 204, 206 but the frequency spectrum of the radio frequency noise is similar on both power planes 204, 206.

A radio frequency noise reduction device 270 is provided for reducing or canceling radio frequency noise on the second power plane 206. The device 270 includes a first operational amplifier (op amp) bandpass filter 234, a second op amp bandpass filter 250, an optical signal isolator 230 and variable gain amplifier 254.

The first op amp bandpass filter 250 is connected to the first power plane 204 and constantly receives a signal 260 that is the voltage potential between the first power plane 204 and the chassis ground 236 of the touch screen display 145. The received signal 260 includes any radio frequency noise that is present on the first power plane 204. The first op amp bandpass filter 250 removes unwanted frequencies from the received signal and outputs 252 the resulting signal.

The second op amp bandpass filter 234 is connected to the second power plane 206 and constantly receives a signal 238 that is the voltage potential between the second power plane 206 and the chassis ground 236. The received signal 238 includes any radio frequency noise that is present on the second power plane 206. The second op amp bandpass filter 234 removes unwanted frequencies from the received signal 238 and outputs the resulting signal 232.

The output signal 252 of the first op amp bandpass filter 250 is connected to the input of the variable gain amplifier 254 where the gain of the amplifier 254 is controlled by the output 240 from the optical signal isolator 230 which is the output signal 232 of the second op amp bandpass filter 234. The output signal 256 of the variable gain amplifier 254 is connected to the second power plane 206. The output signal 256 matches the radio frequency noise present on the second power plane 206 but the output signal 256 is 180 degrees out of phase with the radio frequency noise. Therefore, the output signal 256 when injected into the second power plane 206 cancels the radio frequency noise present on the second power plane 206.

In this embodiment, each of the op amp bandpass filters 250, 234 is configured to remove DC signals and frequencies above 15 MHz. Frequencies above DC and below 15 MHz are passed through the op amp bandpass filters 250, 234. In other embodiments, the op amp bandpass filters 250, 234 filter out DC signals and frequencies above 30 MHz.

In some embodiments, a first antenna is used to receive radio frequency noise present on the first power plane 204 and to provide the radio frequency noise as the input signals to the first op amp bandpass filter 250. The radio frequency noise on the first power plane 204 is measure with respect to chassis ground or earth ground, depending on the configuration of the antenna. A second antenna is used to receive radio frequency noise present on the second power plane 206 and provide the radio frequency noise as the input signals to the second op amp bandpass filter 234. The radio frequency noise on the second power plane 206 is measure with respect to chassis ground or earth ground, depending on the configuration of the antenna. In some embodiments, the first and second antennas are implemented using a dipole antenna. Other embodiments use different types of antennas to measure radio frequency noise on the power planes 204, 206.

Figure 3:
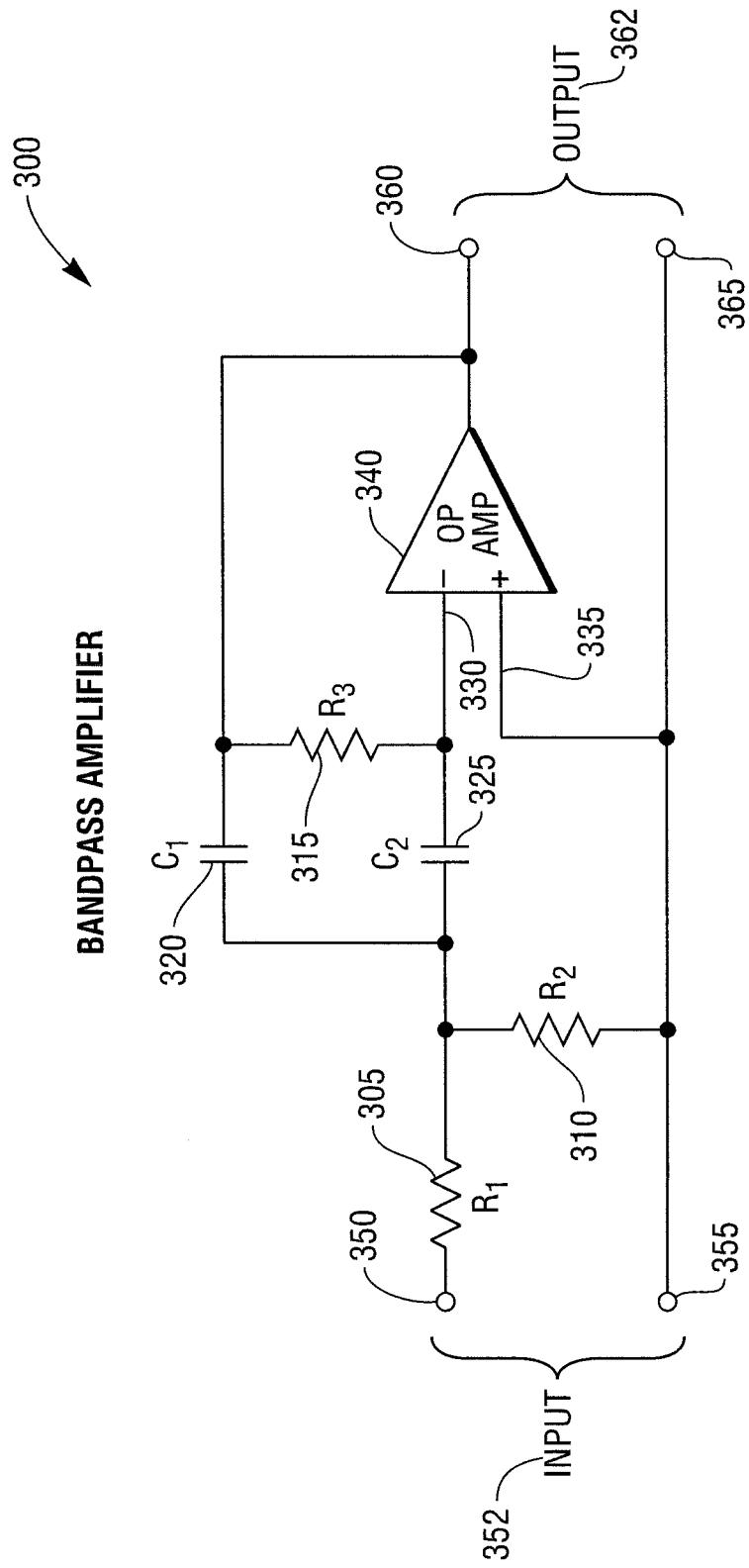
FIG. 3 is a high-level block diagram illustrating an operational amplifier bandpass filter.

With reference to FIG. 3, there is provided a high-level block diagram of a op amp bandpass filter 300. The first and second op amp bandpass filters 250, 234 are based on the op amp bandpass filter 300. The op amp bandpass filter 300 is implemented using passive electrical components and an op amp 340. The input signal 352 of the bandpass filter 300 is applied between a first terminal 350 and a second terminal 355. For the first and second op amp bandpass filters 250, 234, the second terminal 355 of each filter 250, 234 is tied to the chassis ground 236. Resistors R1 305, R2 310 and R3 315 along with capacitors C1 320 and C2 325 determine what frequencies are passed through the op amp bandpass filter 300. The output signal of the bandpass filter circuit is fed into the negative input 330 of an op amp 340. The positive input 335 is tied to the second terminal 355. In this configuration, the op amp 340 inverts the bandpass filtered input signal 352 and produces an output signal 362 across a third terminal 360 and fourth terminal 365. In this configuration, the input signal 352 is filtered to the desired frequency, inverted or phase shifted by 180 degrees and transmitted to the output 362. In other embodiments, the filtered input signal 352 is fed into the positive input 335 of the op amp 340 and the negative input 300 is tied to ground. This produces a filtered non-inverted signal at the output 362.

The op amp 340 may be designed using different commercially available products, such as a Texas Instrument LMV116MF or a Linear Technology LT1995CMS. The values of the resistors and capacitors used in the bandpass filter circuit are dependent on the selected op amp and the desired frequency band to be passed.

The op amp bandpass filter 300 represents one embodiment of a bandpass filter that can be used in the present invention. Other embodiments of a bandpass filter can also be used with the present invention. Some embodiments use more than one op amp and some embodiments use a different configuration of the passive components responsible for filtering the input signal to the desired frequency passband.

Figure 4:
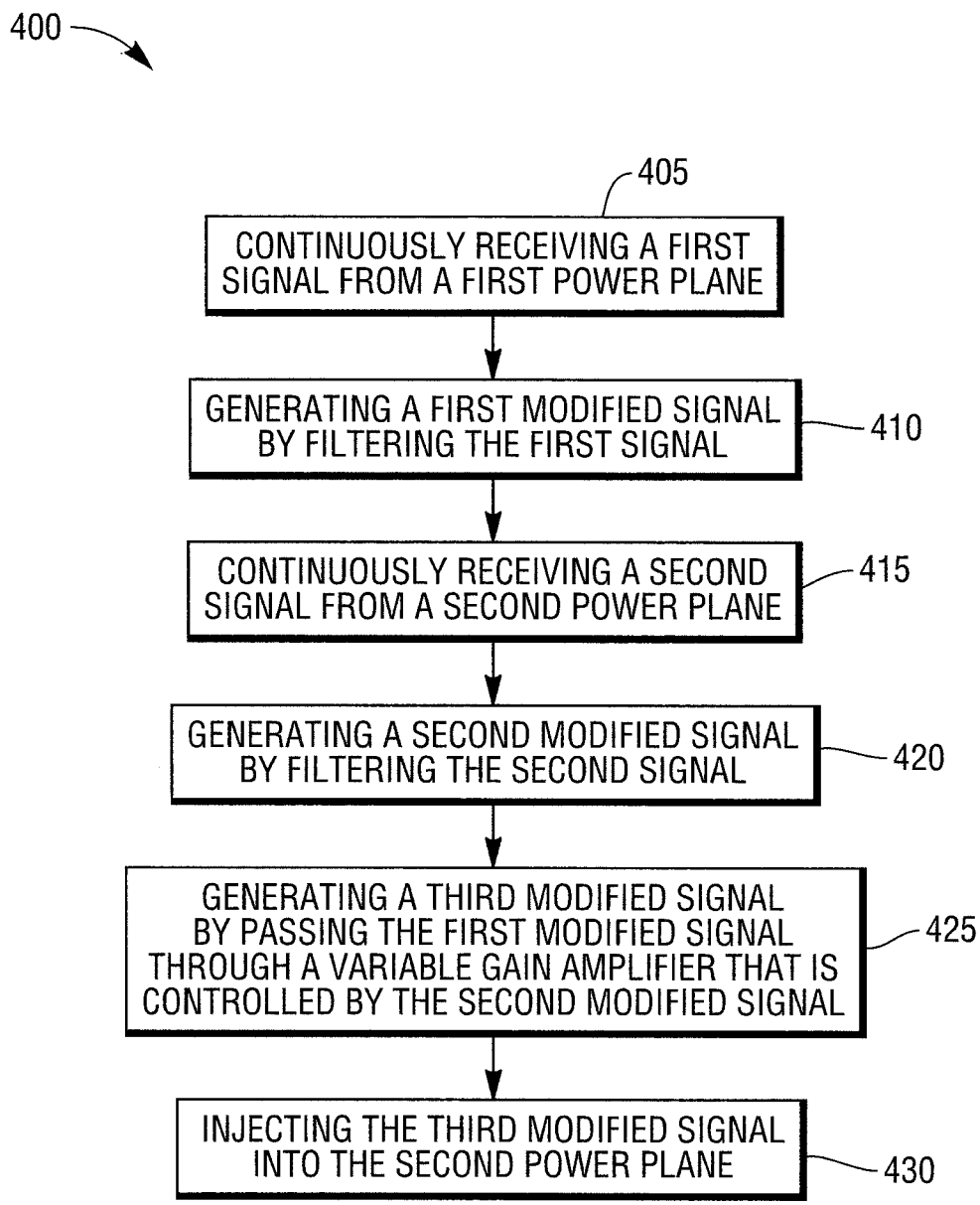
FIG. 4 is a high-level flow diagram illustrating a method of operating the radio frequency noise reduction device of the present invention.

Turning to FIG. 4, there is provided a high-level flow diagram 400 illustrating a method of operating the radio frequency noise reduction device 270 that reduces or cancels radio frequency noise in an electronic apparatus. In this embodiment, the apparatus is the touch screen display 145 that is part of the point of sale terminal 110. The radio frequency noise can originate from different sources. Some sources of radio frequency noise generate radio frequency signals during normal operation but the radio frequency signals escape from designated areas and become radio frequency noise to other components and devices. Other sources of radio frequency noise are designed to generate radio frequency noise that is injected into an apparatus to test the level of immunity or susceptibility the apparatus has to certain radio frequency noise. These sources are normally associated with government certification standards that must be passed before an electronic apparatus can be sold in a country. The standards specify the tests that an electronic apparatus must past before they can be sold.

An example of such a certification standard is the Electromagnetic Compatibility (EMC) standard published and maintained by the International Electrotechnical Commission (IEC). This standard specifies the testing and measuring techniques that must be used to determine the level of immunity an apparatus has to conducted disturbances induced by radio frequency fields. The same apparatus can be required to pass different levels of immunity depending on the function the apparatus performs. For example, a touch screen display when used to perform financial transactions on a point of sale terminal or ATM must demonstrate a higher level of immunity to radio frequency noise than the same touch screen display when used on a personal computer. The radio frequency noise reduction device 270 reduces or eliminates radio frequency noise in an apparatus which allows the apparatus to pass requirements for the higher level of immunity to radio frequency noise required for a financial transaction apparatus.

In step 405, a first signal 260 is continuously received from the first power plane 204. The first signal 260 is measured with reference to the chassis ground 236 for the electronic apparatus which allows radio frequency noise on the first power plane 204 to be measured. This includes the measurement of common mode radio frequency noise.

In step 410, a first modified signal 252 is continuously generated by passing the first signal 260 through the first op amp bandpass filter 250. In this embodiment, the op amp is configured to invert the filtered first signal and the variable gain amplifier 254 is configured to be non-inverting. In other embodiments, the op amp is configured to be non-inverting and the variable gain amplifier 254 is configured to be an inverting amplifier. The first modified signal 252 is the input to the variable gain amplifier 254.

In step 415, a second signal 238 is continuously received from the second power plane 206. The second signal 238 is measured with reference to the chassis ground 236 for the electronic apparatus which allows radio frequency noise on the second power plane 206 to be measured. Measuring from chassis ground 236 further allows common mode noise on the second power plane 206 to be measured. The first power plane 204 and the second power plane 206 are electrically coupled which transmits the radio frequency noise on the first power plane 204 to the second power plane 206.

In step 420, a second modified signal 232 is continuously generated by passing the second signal 238 through the second op amp bandpass filter 234. In this embodiment, the op amp is configured to invert the filtered second signal 238. In other embodiments, the op amp is configured to be non-inverting. The second modified signal 232 is used to control the gain of the variable gain amplifier 254. Some conditioning of the first modified signal 232 is required before it is used to control the gain.

Whatever op amp configuration is used, the final output signal of the radio frequency noise reduction device 270 is a signal that matches the frequency spectrum of the filtered first signal 260 and an amplitude of that matches the filtered second signal 238 but has a phase that is shifted by 180 degrees. The shifted output signal cancels or reduces the noise on the second power plane 206.

In step 425, a third modified signal 256 is continuously generated by passing the first modified signal 252 through the variable gain amplifier 254 where the gain is controlled by the second modified signal 232. The output signal 256 of the variable gain amplifier 254 is connected to the second power plane 206.

In step 430, the third modified signal 256 is injected into the second power plane 206. The third modified signal 256 matches the frequency spectrum of the filtered first signal but has a phase that is shifted by 180 degrees which cancels or reduces the radio frequency noise on the second power plane 206.

Although the present invention has been described with particular reference to certain preferred embodiments thereof, variations and modifications of the present invention can be effected within the spirit and scope of the following claims. For example, it is envisioned that the present invention can be used in an automatic teller machine or apparatus that performs financial transactions.

What is claimed is:

1. A radio frequency noise reduction device used in an electronic apparatus, the radio frequency noise reduction device comprising:
    a first bandpass filter adapted to receive a first signal from a first power plane where the first signal includes radio frequency noise and is referenced to chassis ground and where the first bandpass filter is further adapted to output only a first predetermined band of radio frequencies;
    a second bandpass filter adapted to receive a second signal from a second power plane physically isolated from the first power plane but electrically coupled to the first power plane and where the second signal is referenced to chassis ground and includes radio frequency noise and where the second bandpass filter is further adapted to output only the first predetermined band of radio frequencies; and
    a variable gain amplifier adapted to receive and amplify the output of the first bandpass filter and adapted to use the output of the second bandpass filter to control a gain of the variable gain amplifier wherein the output of the variable gain amplifier is connected to the second power plane and wherein the variable gain amplifier is further adapted to produce an output signal that cancels radio frequency noise on the second power plane.

2. The device of claim 1, wherein the output signal of the variable gain amplifier has the frequency spectrum of the radio frequency noise on the first power plane shifted in phase by 180 degrees and has the amplitude of the radio frequency noise on the second power plane.

3. The device of claim 1, wherein the first and second power planes are ground planes.

4. The device of claim 1, wherein the first predetermined band of radio frequencies consists of frequencies above DC and below 15 MHz.

5. The device of claim 1, wherein capacitive and inductive coupling between the first power plane and the second power plane causes radio frequency noise on the first power plane to be transmitted to the second power plane.

6. The device of claim 1, wherein the electronic apparatus is a touch screen display where the touch screen component of the touch screen display uses projected capacitance technology to detect a touch.

7. The device of claim 6, wherein the touch screen display is part of a point of sale terminal.

8. The device of claim 6, wherein the touch screen display is part of an automatic teller machine.

9. The device of claim 1, further including an optical signal isolator that transmits the output of the second bandpass filter between the second power plane and the first power plane and to the variable gain amplifier.

10. The device of claim 1, wherein the first and second bandpass filters are operational amplifier bandpass filters.

11. A method of reducing radio frequency noise in an electronic apparatus including a first power plane and a second power plane that is physically isolated from the first power plane, the method comprising:
    continuously receiving a first signal from the first power plane where the voltage of the first signal is measured with respect to chassis ground;
    generating a first modified signal by passing the received first signal through a first bandpass filter set to limit the frequencies that comprise the first modified signal to a first predefined frequency band;
    continuously receiving a second signal from the second power plane where the voltage of the second signal is measured with respect to chassis ground;
    generating a second modified signal by passing the received second signal through a second bandpass filter set to limit the frequencies that comprise the second modified signal to the first predefined frequency band;
    generating a third modified signal by passing the first modified signal through a variable gain amplifier where the second modified signal controls a gain of the variable gain amplifier and where the output of the variable gain amplifier is the first signal filtered with a phase shifted by 180 degrees; and
    injecting the third modified signal into the second power plane where the third modified signal cancels the radio frequency noise on the second power plane.

12. The method of claim 11, wherein the first predefined frequency band consists of frequencies that are less than 15 MHz and greater than 0 hertz.

13. The method of claim 11, wherein the first and second power planes are ground planes.

14. The method of claim 13, wherein capacitive and inductive coupling between the first power plane and the second power plane causes radio frequency noise on the first power plane to be transmitted to the second power plane.

15. The method of claim 11, wherein the electronic apparatus is a touch screen display of a point of sale terminal.

16. The method of claim 11, wherein the electronic apparatus is a touch screen display of an automatic teller machine.

17. The method of claim 11, wherein the second power plane is attached to a touch screen controller adapted to control the touch screen portion of a touch screen display.

18. The method of claim 17, wherein the touch screen portion of the touch screen display uses projected capacitance technology to identify touch locations made to the touch screen display.

19. The method of claim 11, wherein the radio frequency noise is injected into the first power plane as part of a radio frequency immunity test for radio frequency noise.

20. The method of claim 11, wherein the first and second bandpass filters are operational amplifier bandpass filters.

\* \* \* \* \*